J. B. CORYELL.
TRACTOR.
APPLICATION FILED JULY 18, 1918.

1,309,085.

Patented July 8, 1919.
4 SHEETS—SHEET 1.

Inventor
John B. Coryell
By S. E. Thomas
Attorney

J. B. CORYELL.
TRACTOR.
APPLICATION FILED JULY 18, 1918.

1,309,085.

Patented July 8, 1919.
4 SHEETS—SHEET 3.

Inventor
John B. Coryell
By S. E. Thomas
Attorney

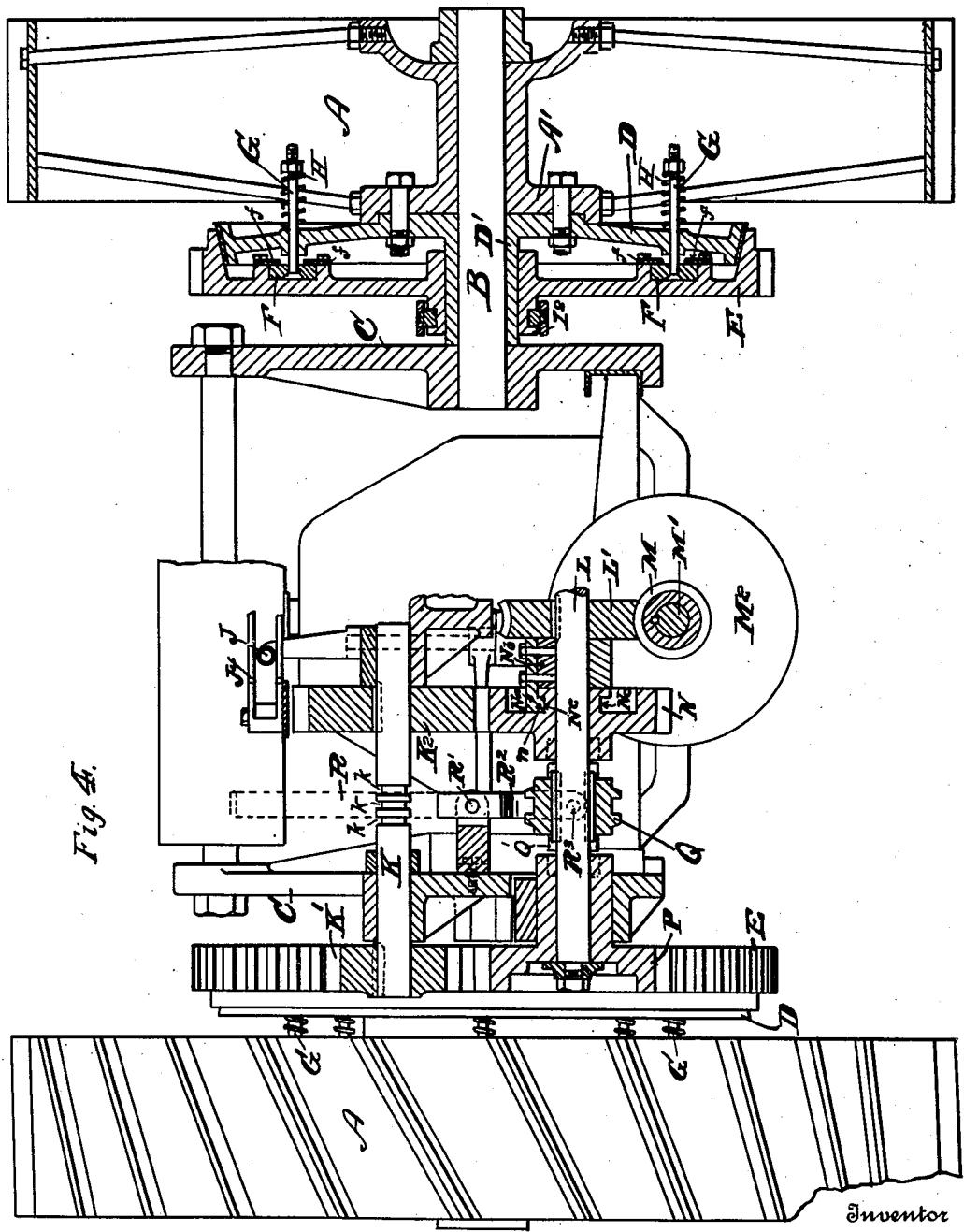

UNITED STATES PATENT OFFICE.

JOHN B. CORYELL, OF ADRIAN, MICHIGAN.

TRACTOR.

1,309,085.  Specification of Letters Patent.  Patented July 8, 1919.

Application filed July 18, 1918. Serial No. 245,526.

*To all whom it may concern:*

Be it known that I, JOHN B. CORYELL, citizen of the United States, residing at Adrian, county of Lenawee, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

This invention relates to an improvement in tractors, shown in the accompanying drawings and more particularly set forth in the following specification and claims.

One object of this invention is to provide a tractor adapted to make a short right angle turn, so as to operate close to fence intersections, thus making it especially desirable for use upon relatively small farms where it is essential that every foot of available land may be put under cultivation.

Another object of the invention is simplicity of construction and operation,—first that the cost of production may be reduced to the minimum and second that it may be operated successfully by unskilled labor.

In putting these objects into effect the usual differential gearing employed in motor driven vehicles has been eliminated, the respective traction wheels being operably connected with the driving gears by suitable clutch mechanism which may be actuated to connect the driving mechanism with the traction wheels to drive the latter forward or in a reverse direction,—with both traction wheels rotating in the same direction, or one forward and the other reversed to make a very short turn.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings, forming part of this specification,—

Fig. 4 is a rear elevation, with parts broken away and in section:—the sectional portion of the left-hand side of the view being taken on line 4—4 of Fig. 1; the right-hand side of the view being a central cross-section taken on line $4^a$—$4^a$ of Fig. 1.

Referring now to the letters of reference placed upon the drawings:—

A denotes the tractor wheels, B are spindles projecting from the supporting frame C, which serve as an axle for the tractor wheels, D is the male member of a cone-clutch bolted to the flange of the hub A' of the tractor wheels A. The clutch member D is provided with a hub portion D', on which is sleeved the hub of the combined driving gear and co-acting female clutch member E. F is a ring mounted upon the clutch-gear member E, by spaced lugs f, secured to the spokes of the latter. Projecting from the ring F and through the clutch member D are a plurality of bolts G, on which are respectively mounted springs H, adapted to force the clutch member E into engaging or driving relation with the member D. I indicates a rocking arm pivoted at I' to the frame C, having at one end a yoke $I^2$ fitted with inwardly directed lugs $I^3$ adapted to enter a peripheral groove e in the hub of the clutch-gear member E, whereby the latter may be shifted longitudinally upon the hub D' of the member D. J, J, are manually operated rocking levers pivoted to the frame at J', J', and connected with the arms I, by an adjustable clevis or link $J^2$. $J^3$ is a suitable spring actuated dog pivoted to the levers J designed to engage a ratchet toothed sector $J^4$, to secure the lever against accidental release when manually adjusted.

Figure 1:
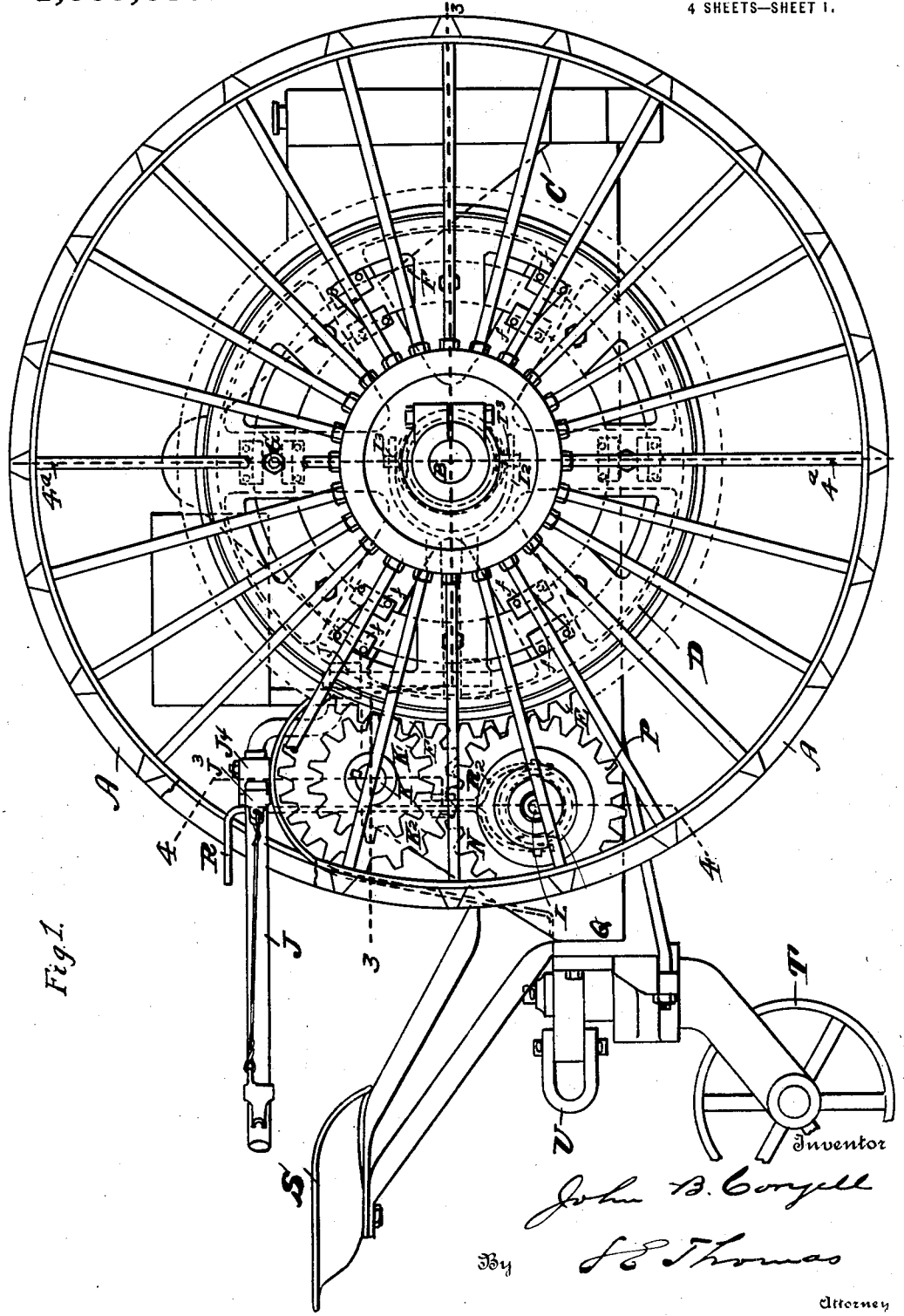
Figure 1 is a side elevation of the tractor with parts broken away.
Figure 2:
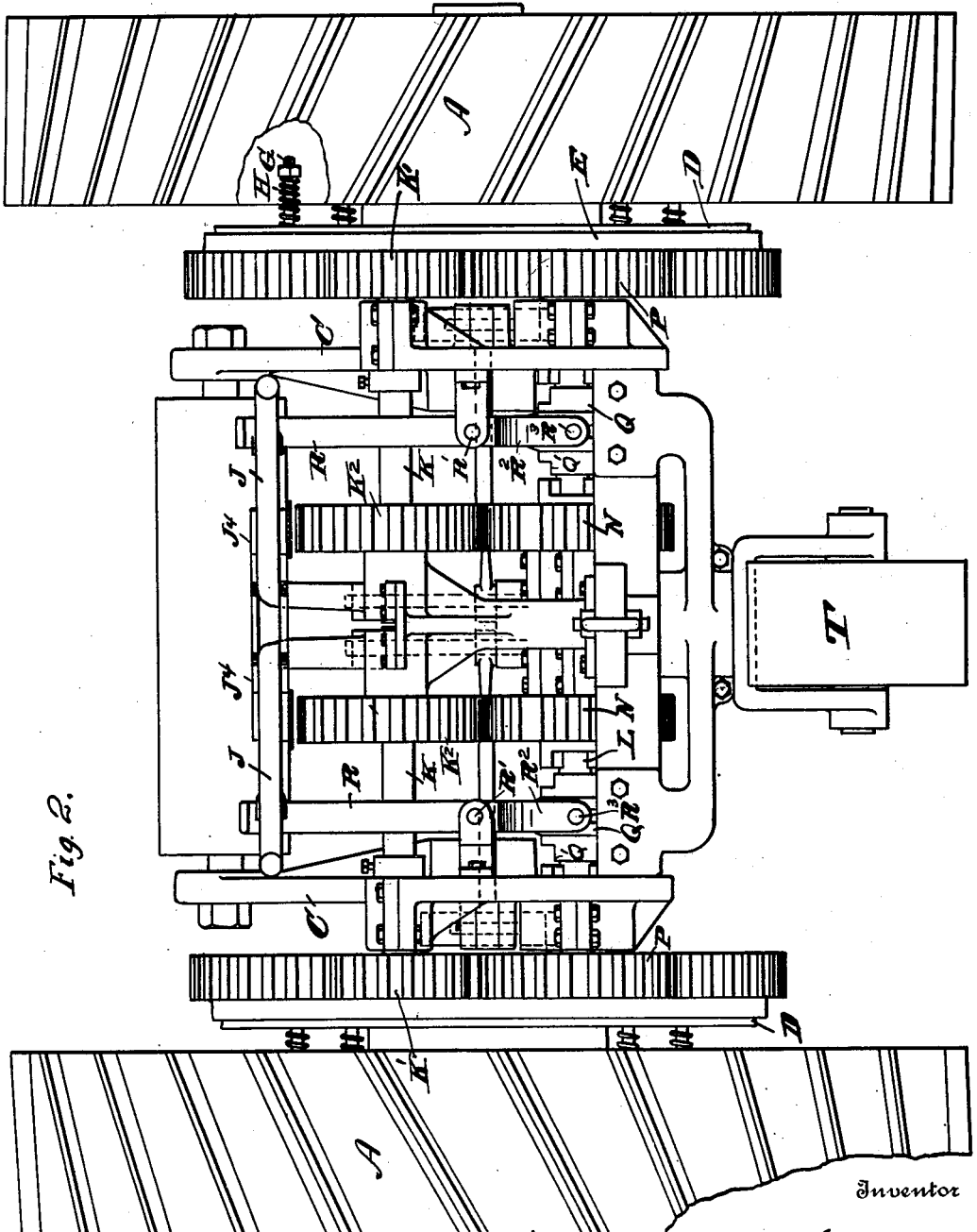
Fig. 2 is a rear elevation of the same, with parts broken away and in section.
Figure 3:
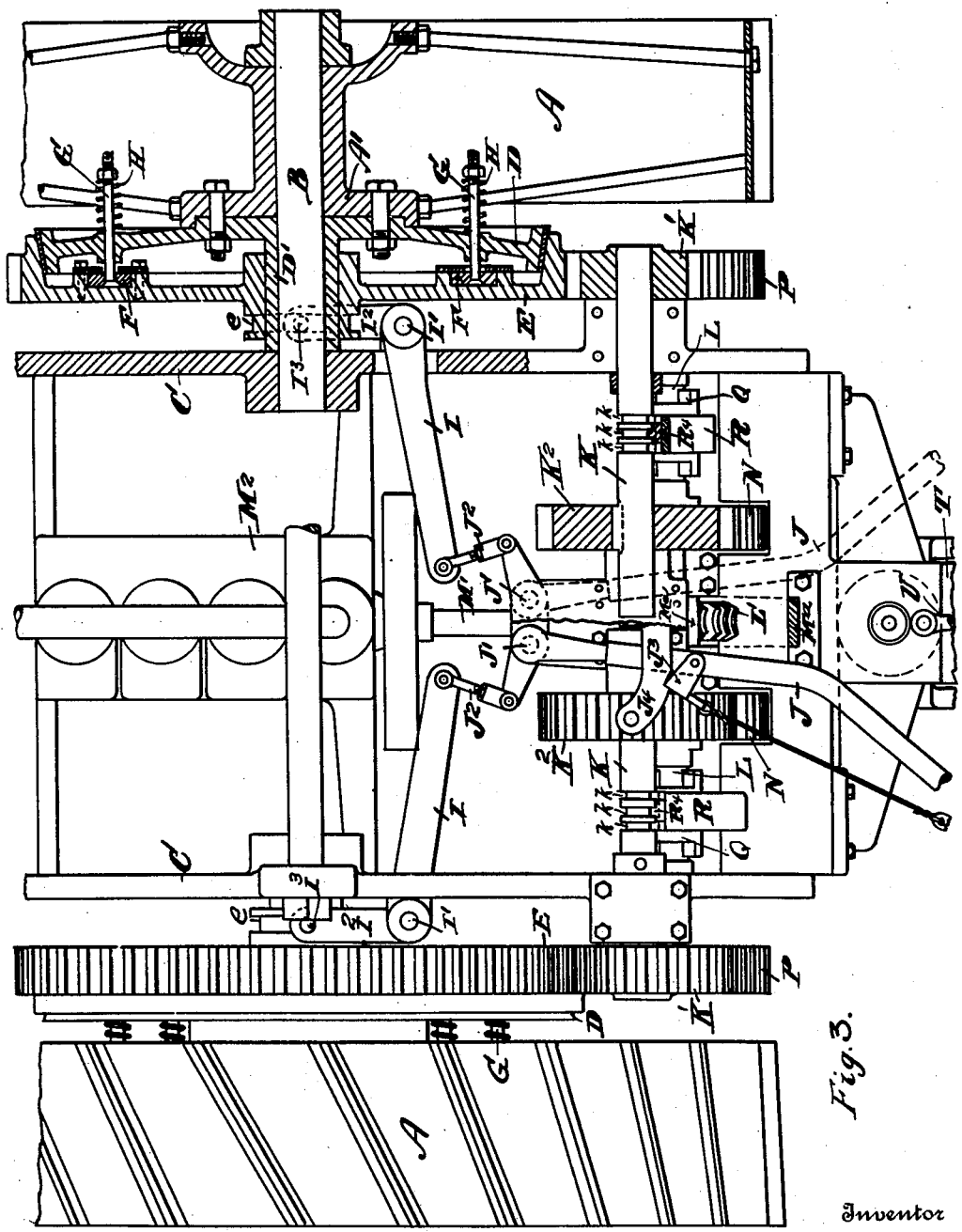
Fig. 3 is a plan-sectional view:—the sectional portion of the view being taken on line 3—3 of Fig. 1.

K, K, is a divided shaft journaled in the frame on the outer ends of which are mounted pinions K', K', respectively in mesh with the clutch-gears E of each tractor wheel. $K^2$, $K^2$, are gears mounted adjacent to the inner end of each section of the divided shaft K. L is a transverse shaft located below the divided shaft K fitted with a worm gear L' keyed thereto, in mesh with a worm gear M, on the driving shaft M' of the engine $M^2$. $M^a$ is a guard, shown broken away and in section in Fig. 3 to disclose the gear L' which it incloses. Suitable guards are also provided for the several trains of gears but these have been omitted in the drawings to more clearly disclose the construction. N are gears mounted on the shaft L, in mesh with the gears K², of the divided shaft K, K. The gear N while loosely mounted upon the shaft L, is held against longitudinal movement upon the shaft, by a block Nᵃ bolted to the bearing Nᵇ, the block having a projecting lug n, extending into a peripheral groove Nᶜ in the hub of the gear N. P, is a gear mounted upon each end of the shaft L, respectively in mesh with the clutch gears E, E of the tractor wheels. Mounted upon the shaft L, between the hubs of the gears N and P, is a slidable clutch member Q, having teeth Q' adapted to enter coacting notches formed in the ends of the respective hubs of the gears N and P, whereby the latter may be alternately locked to the shaft to rotate therewith. R is a manually operated lever pivoted at R' to the frame, having a yoke R² at its lower end to receive the clutch member Q. R³ are inwardly directed pins carried by the yoke R² extending into a peripheral groove in the slidable clutch member Q, whereby the latter may be shifted to the right or left to alternately engage the gears N or P upon the manual operation of the lever R. Projecting from the lever R is a detent R⁴, adapted to enter one of three peripheral grooves k, formed on the shaft K, to respectively maintain the clutch member Q in locked relation with either of the gears N or P, or in a neutral or inoperative relation to each of said gears.

S, indicates a seat secured to the frame. T denotes a caster wheel journaled in the frame beneath the seat. V is a clevis for connecting plows or other implements to the tractor.

Having thus indicated the several parts by reference letters the construction and operation of my invention will be readily understood.

It will first be assumed that the engine is operating under its own power—the gear M, carried by the engine shaft driving the shaft L through the gear L', with which it is in mesh. To drive the tractor directly ahead the levers R, R are operated to throw the respective clutches Q into engagement with the coöperating end of the gears P:—the latter being respectively in mesh with the clutch gears E. The levers J, J, controlling the slidable clutch-gear member E, are then released from the control of the dogs J³, which engage the sector J⁴, thereby permitting the springs G to force the members E, into co-acting relation with the clutch member D, bolted to the tractor wheels:—the tractor is thus driven in a forward direction.

To reverse the direction of the tractor, the clutch levers R are swung in the opposite direction forcing the clutches Q, into engagement with the coöperating clutch members on the end of the hub of the gears N.

The gears N are thereby locked to the shaft L and being in mesh with the gear K², keyed to the shaft K, rotate the pinion K' keyed to the outer end of the shaft and in mesh with the clutch-gear E. The female clutch-gear member E, being in locked relation with the male member D, the tractor is operated in a reverse direction. If it is desired to arrest the movement of the tractor without stopping the engine the levers R may be operated so as to shift the clutch member Q to a midway or "neutral" position as indicated in Fig. 4:—the detent R⁴ carried by the levers occupying the central peripheral groove k, on the shaft K,—the grooves k k, to the right and left of the central groove serving to hold the lever controlling the clutch Q in locked relation with the gears P or N as required. The clutch-gear E, may also be released from driving relation with the tractor wheels by the operation of the levers J, J, to withdraw the member E from engagement with the member D and against the action of the springs G. To make a right angle turn the clutch controlling the tractor wheel which serves as the "pivot" is allowed to remain in "neutral" or disengaged relation to the "pivot" tractor wheel, while the clutch controlling the outer wheel is operated to lock said tractor wheel in operative relation with the driving mechanism. The clutches may, if desired, be engaged so as to reverse the direction of the "inner" tractor wheel, while driving the "outer" tractor wheel in a forward direction, thereby causing the tractor to turn within a very restricted arc.

It will be noted that the driving gears are always in mesh, therefore the clashing and wear of the gears incident to throwing them into and out of engagement is avoided.

Having thus described my invention what I claim is:

1. In a tractor, the combination of a pair of tractor wheels and a source of power carried by the tractor, of a clutch member secured to each tractor wheel, respectively coöperating and longitudinally slidable clutch and gear members adapted to connect either or both of said tractor wheels with the source of power, two independent trains of gears permanently in mesh with the combined clutch and gear member of each tractor wheel, and means for connecting said respective trains of gears with the source of power, whereby the tractor wheels may be rotated in unison in a forward or in a reverse direction, or rotated independently of each other in a forward or reverse direction.

2. In a tractor, the combination of a pair of tractor wheels loosely mounted upon their axle and a source of power carried by the tractor, of a clutch member secured to each tractor wheel, a pair of respectively coöperable and longitudinally slidable clutch and gear members adapted to connect either or both of said tractor wheels with the source of power, independent trains of gears permanently in mesh with the combined clutch and gear member of each tractor wheel, and suitable manually operated clutch means for connecting said respective trains of gears with the source of power.

3. In a tractor, the combination of a pair of tractor wheels and a source of power carried by the tractor, of a clutch member secured to each of said tractor wheels, a slidable clutch and gear member adapted to coöperate with each of the clutch members secured to the tractor wheels, an independently movable ring loosely supported by each of said last named members, a plurality of bolts secured to said ring and projecting through apertures provided in the clutch member secured to the tractor wheels, springs carried by the bolts adapted to force the coöperating members of the clutch into locked relation, manually operable means for independently releasing said clutch members from their locked relation due to the action of said springs, independent trains of gears permanently in mesh with the gear of the clutch member connecting the tractor wheels with the source of power, whereby said tractor wheels may be rotated in either a forward or reverse direction, and a manually operable clutch mechanism for connecting said tractor wheels through said respective trains of gears with the source of power whereby said wheels may be driven ahead, reversed, or independently operated.

4. In a tractor, a source of power, a drive shaft, a worm gear on said drive shaft, a transverse shaft fitted with a worm gear in mesh with the worm gear of the drive shaft, a pair of tractor wheels, a clutch member carried by each of said wheels, a pair of slidable co-acting gear clutch members, a pinion loosely sleeved upon the transverse shaft in mesh with the gear of the clutch member, a manually operable clutch adapted to secure said pinion to the transverse shaft, and means for controlling the operation of the gear clutch member, whereby the tractor wheels may be operably connected with the source of power.

5. In a tractor, a source of power, a pair of tractor wheels, a drive shaft, a gear on said drive shaft, a transverse shaft fitted with a gear in mesh with the gear on the drive shaft, a pinion mounted on each end of said transverse shaft, a pair of male clutch members secured to the tractor wheels, co-acting female clutch members fitted with gears with which the pinions of the transverse shaft are permanently in mesh, means for controlling the operation of said last named clutch members, a divided shaft located above the transverse shaft fitted with pinions in mesh with the female clutch gears, gears keyed to the divided shaft, gears in mesh with said last named shaft mounted upon the transverse shaft, a manually operable clutch adapted for alternately locking the gears or pinions to said transverse shaft, whereby the tractor wheels may be driven ahead or reversed, and means for securing said manually operable means in either a "neutral" or "operative" relation to said last named gears or pinions.

In testimony whereof, I sign this specification in the presence of two witnesses.

JOHN B. CORYELL.

Witnesses:
  HENRY H. HOWELL,
  ALISTER B. STAUP.